Patented Jan. 17, 1950

2,494,928

UNITED STATES PATENT OFFICE 2,494,928

PROCESS FOR THE PREPARATION OF AROMATIC COFFEE EXTRACT

Heinrich Cohen, Geneva, Switzerland, assignor to Laboratoires Medial S. A., Geneva, Switzerland, a Swiss corporation No Drawing. Application July 3, 1946, Serial No. 681,423. In Switzerland July 11, 1945

8 Claims. (Cl. 99—71)

For preparing an aromatic coffee extract which, on the one hand, keeps perfectly and, on the other hand, gives, once dissolved in boiling water, a beverage similar to that directly obtained from freshly roasted and ground coffee beans, i. e. which will have the same taste as a freshly prepared coffee infusion, it is necessary that such a coffee extract be free from fatty substances liable to become rancid, and further contains all the elements giving taste and aroma to the freshly prepared coffee infusion.

These desiderata have not been realized until now. The known processes for the preparation of coffee extract can be classified into two groups. One of these groups comprises the processes in which the extraction of the element giving taste and aroma is carried out with boiling water. Losses of aromatic elements, by volatilization or decomposition, will necessarily result from such an extraction. The other group comprises the processes in which one or more extractions are carried out by means of aromatic solvents, but these extractions also promote the extraction of the fatty substances which always partly remain in the final aromatic extract and are prejudicial to its good preservation.

The inventor has observed the two following unexpected facts:

(1) The open chain (aliphatic) hydrocarbons, such, for example, as pentane, hexane, as well as their mixtures, like those known as "petrol ether," "petrol," "gasolene," entirely dissolve the fatty substances contained in the coffee, without extracting the elements giving taste and aroma. It is therefore possible, with a coffee freed from its fatty substances by means of the above mentioned hydrocarbons, to prepare an infusion similar to that obtained with freshly roasted and ground coffee beans.

(2) The coffee having its grease eliminated by means of open chain hydrocarbons, is able to be further extracted with any other known organic solvents, as for instance ethers, ketones (acetone), aromatic hydrocarbons (benzene), alcohols (ethyl alcohol), etc., and this extraction will give dark colored solutions. Such a coffee is also able to be treated with boiling water in order to extract its water soluble elements.

The present invention, which is based on the above findings, relates to a process for the preparation of an aromatic coffee extract.

This process comprises two distinct extractions with different organic solvents for obtaining, on the one hand, the fatty substances of the coffee and, on the other hand, the aromatic elements of the coffee, and another extraction with hot water for the purpose of withdrawing from the coffee the products imparting flavor and color to the coffee infusion. According to the invention, one of the said organic solvents consists essentially of at least one open chain hydrocarbon whereas the other organic solvent contains at least one component other than an open-chain hydrocarbon, the solution obtained with the solvent consisting essentially of at least one open chain hydrocarbon and containing practically exclusively the fatty substances of the coffee being put aside so as to obtain finally an extract void of fatty substances. This extract may be either the aromatic elements of the coffee or the products imparting flavor and color, or, again, a mixture of these elements and these products.

This extract keeps perfectly and for a long time owing to the fact that it is void of fatty substances; it is soluble in hot water. It may contain more or less water according to whether the latter's elimination has been more or less intensified when concentrating the aqueous extract. This final extract may thus be presented in syrup, paste or powder form, and it can be made up into tablets, pills, tabloids, etc., after being mixed, if desirable, with milk powder or condensed milk. The extract may be used as an addition to coffee substitutes so as to enhance their aroma or may, further, be mixed with extracts from such substitutes.

One or both of the two extractions made with the help of organic solvents may be effected at low temperature. It is particularly advantageous to effect the extraction with the solvent consisting essentially of at least one open chain hydrocarbon at a temperature approaching 0° C., for, in these conditions, such a solvent actually draws out only the fatty substances. In fact, the colder the solvent is employed the less aroma it extracts. Moreover, making the extractions at low temperature avoids loss in aromatic elements.

According to one embodiment of the process of the invention, raw coffee or coffee dried at 120° C. or roasted may be treated with the solvent consisting essentially of at least one open chain hydrocarbon so as to eliminate the fatty substances of the original coffee; afterwards, from the coffee deprived of its fatty substances and roasted, the aromatic elements, for the one part, are extracted by means of an organic solvent containing at least one component other than an open chain hydrocarbon and, for the other part, the products of the coffee imparting flavor and color are extracted with hot water. Finally, the organic solution and the aqueous solution both obtained from the coffee rid of its fatty substances, are so treated as to eliminate at least part of their solvents and to combine their residues.

According to another embodiment of the process, the roasted coffee may first be treated with an organic solvent containing at least one component other than an open chain hydrocarbon so as to extract from the original coffee its fatty and aromatic constituents. In the first extraction product thus obtained, the fatty substances are separated from the aromatic elements by extraction with the help of the solvent consisting essentially of at least one open chain hydrocarbon so as to eliminate the said fatty substances. The coffee, having been subjected to the first extraction, is treated with hot water to withdraw from it the products giving flavor and color, and these products are then combined with the aromatic elements. To separate in the first extraction product the fatty substances from the aromatic elements, the solvent in the solution obtained by treating the original coffee may be evaporated and the residue from this evaporation treated with the solvent consisting essentially of at least one open chain hydrocarbon.

For the practical carrying out of the process of the invention, the operation may, for example, be as follows:

In a Soxhlet apparatus, all the fatty oil contained in the roasted coffee beans is extracted by means of petrol ether (distilling preferably below 50° C.); the extraction liquid containing the oil is put aside and is no longer concerned in the process of the invention; it can be employed for other purposes. The last traces of petrol ether are eradicated from the coffee beans treated by moderate heating or under a vacuum.

The coffee deprived of its fats is afterwards extracted with ethyl ether, acetone, benzene or the like, or with a mixture of these bodies which should preferably possess a low boiling point. The solvent laden with the aromatic elements is separated and the last traces of solvent are eliminated from the residue of the coffee beans.

The residue thus deprived of its fatty and aromatic constituents is treated with hot water to extract from it all the elements soluble in water, especially the products imparting flavor and color to the coffee infusion; an aqueous solution of these products is thus obtained. This solution is evaporated under a vacuum or under ordinary pressure. It is advantageous to add to it, before evaporation, a carbohydrate—milk sugar, for example—which reduces the hygroscopicity of the extract obtained.

The organic solution containing the aromatic elements may be dry-evaporated after the addition of a carbohydrate and the residue thus obtained combined with the dry extract derived from the aqueous solution. But the organic solution may also be slowly added, while being stirred, to the dry extract derived from the aqueous solution, and the whole evaporated under reduced pressure or at atmospheric pressure while being slightly heated. With either method, the total or partial elimination of the solvents of the aqueous solution and of the organic solution and the combination of the residues are achieved and result finally in the aromatic coffee extract.

This extract is easily soluble in hot water; it contains the elements imparting aroma, flavor and color to the coffee infusion; it thus allows of preparing a beverage identical with the best coffee infusion. Moreover, as already indicated, it keeps well and for a long time owing to the fact that it is void of fatty substances and that, in certain cases, it may contain a carbohydrate (milk sugar).

As the extraction made with hot water withdraws from the coffee the products imparting flavor and color, whereas the aromatic elements are extracted with an organic solvent, the aqueous solution of the said products may be subjected to any physical treatment without any risk of deteriorating the quality of the aroma of the extract.

*Example*

Freshly roasted and ground coffee beans are introduced into a large Soxhlet apparatus and the extraction is effected with petrol ether. To do this, the part of the apparatus which contains the coffee beans or that in which the petrol ether condenses is cooled to the temperature of approximately 0° C. The extraction of the fatty oils is thus made at a low temperature and the petrol ether draws out only these oils and no aromatic elements. The solution obtained is withdrawn from the apparatus and put aside; all the petrol ether is driven from the coffee beans and the apparatus. The latter is charged with ethyl ether and the extraction is continued, but without cooling the solvent.

The ether of the solution is distilled under reduced pressure at low temperature after adding milk sugar to this solution. A strongly aromatic residue is thus obtained.

The coffee beans are taken out of the apparatus and steeped in hot water. The liquid is then filtered to separate it from the beans. Milk sugar is added to the liquid and the water is evaporated from it under reduced pressure until a dry residue is obtained. The latter is mixed with the aromatic residue and the whole finely ground.

A powdery extract is obtained which will keep without deteriorating or losing its aroma, especially when it is preserved in hermetically closed containers. Dissolved in hot water, it gives a beverage absolutely identical with freshly prepared coffee infusion.

The fatty substances of the coffee can profitably be recovered from the petrol ether solution which has been laid aside and be utilised independently of the process of the present invention.

What I claim is:

1. Process for the preparation of aromatic coffee extract, which comprises subjecting coffee to two distinct extractions to obtain the whole of the fatty substances and the aromatic elements in two separate solutions, using a member selected from the group consisting of pentane, hexane, petrol ether, petrol and gasoline to extract the fatty substances, using in the other operation a solvent for the aromatic elements, treating the residues of said two extractions with hot water to extract the flavoring and coloring products of the coffee, evaporating the solution containing the extracted aromatic elements and the aqueous solution containing the extracted flavoring and coloring products, and combining said aromatic elements with said flavoring and coloring products, the combined extracts constituting an aromatic coffee extract void of fatty substances.

2. The process according to claim 1, wherein the extraction of the fatty substances is carried out at a low temperature.

3. In the process according to claim 1, the step of adding a carbohydrate to said aqueous solution before its evaporation.

4. Process for the preparation of aromatic coffee extract, which comprises treating the starting coffee with a solvent selected from the group consisting of pentane, hexane, petrol ether, petrol, and gasoline to extract the fatty substances from the coffee, treating the so degreased coffee with an organic solvent capable of dissolving the aromatic elements in order to extract same, treating the residues of said two extractions with hot water to extract the flavoring and coloring products of the coffee, and combining said extracted aromatic elements with said extracted flavoring and coloring products, the combined extracts constituting an aromatic coffee extract void of fatty substances.

5. The process according to claim 4, wherein the treatment of the starting coffee is carried out at a temperature of approximately 0° C.

6. The process according to claim 4, wherein said organic solvent is selected from the group consisting of ethers, alcohols, ketones, aldehydes, aromatic hydrocarbons, and halogenous hydrocarbons.

7. Process for the preparation of aromatic coffee extract, which comprises treating the starting coffee with an organic solvent selected from the group consisting of ethers, alcohols, ketones, aldehydes, aromatic hydrocarbons, and halogenous hydrocarbons to dissolve both the aromatic elements and fatty substances, treating the remaining residue with hot water to extract the flavoring and coloring products of the coffee, evaporating the solution containing said extracted aromatic elements and fatty substances, treating the residue of said evaporation with a solvent selected from the group consisting of pentane, hexane, petrol ether, petrol, and gasoline to remove the whole of the fatty substances, to the exclusion of the aromatic elements, and combining said extracted aromatic elements freed of fatty substances with said extracted flavoring and coloring products to obtain an aromatic coffee extract which is void of fatty substances.

8. The process as defined in claim 7, wherein the treatment of the starting coffee is carried out at a temperature of approximately 0° C.

HEINRICH COHEN.

REFERENCES CITED

The following references are of record in the file of this patent:

UNITED STATES PATENTS

| Number | Name | Date |
|---|---|---|
| 1,123,828 | Whitaker et al. | Jan. 5, 1915 |
| 1,175,091 | Vietinghoff | Mar. 14, 1916 |
| 1,175,490 | Vietinghoff | Mar. 14, 1916 |
| 2,071,011 | Wendt | Feb. 16, 1937 |
| 2,286,334 | Brandt | June 16, 1942 |

FOREIGN PATENTS

| Number | Country | Date |
|---|---|---|
| 3,797 | Great Britain | of 1877 |
| 25,211 | Great Britain | of 1906 |